3,132,115
COMPOSITION COMPRISING A LIQUID 1,2-EPOXY RESIN AND D-LIMONENE

Frank Eric Pschorr and Joseph Robert Weschler, Toms River, N.J., assignors to Ciba Corporation, a corporation of Delaware
No Drawing. Filed Aug. 15, 1961, Ser. No. 131,476
6 Claims. (Cl. 260—29.8)

This invention relates to novel resinous compositions and, more particularly, to epoxy resin compositions of improved viscosity characteristics.

Epoxy resins are versatile industrial chemicals having a wide range of commercial applicability. Thus, they are useful as adhesives, in coating compositions, in casting and molding compositions, and in flooring compositions. Frequently, in these applications, it is desired to reduce the viscosity of the resins in order to obtain improvements in wetting ability or penetration or other properties of the resin or the modified resin system. For this purpose, a number of diluents have been suggested and employed in the formulation of epoxy resin compositions. Among the diluents heretofore employed there may be mentioned butyl glycidyl ether, 1,4-butanediol diglycidyl ether, styrene oxide, xylene and propylene oxide. These, and other substances, have not proven completely satisfactory because of their adverse effect, in varying degrees, upon the physical properties of cured epoxy resins. Thus, the known diluents decrease heat-distortion temperature and hardness, reduce adhesion and, finally, exhibit an undesirable dermatitic activity. It is obvious, therefore, that the provision of a diluent for use in epoxy resin formulations which will effectively reduce the viscosity while minimizing or avoiding the disadvantageous effects of the known diluents is a desirable objective in the epoxy resin field.

It is, therefore, an object of this invention to provide a viscosity reducing agent for use in epoxy resin compositions.

It is another object of this invention to provide epoxy resin compositions of improved viscosity characteristics.

It is a further object of this invention to provide epoxy resin compositions of improved spreadability.

It is a more particular object of this invention to provide improved epoxy resin flooring compositions.

Other objects of the invention will in part be obvious and will in part appear hereinafter.

It has been found in accordance with the present invention that epoxy resin compositions of desired viscosity characteristics can be obtained without the loss of other desirable properties by the use of d-limonene as a viscosity reducing agent for epoxy resin systems. In particular, it has been found that flooring compounds of improved spreadability and excellent resistance characteristics can be obtained through the use of d-limonene in the epoxy resin-based flooring formulation.

The d-limonene employed in the compositions of this invention can be employed in an amount equal to from about 0.5% to about 15.0% by weight of the epoxy resin in the final composition. However, for the achievement of optimum results it has been found that the use of an amount equal to about 5.0% by weight based on the epoxy resin present is preferable.

The epoxy resin fluidized according to the present invention by the incorporation of d-limonene into the epoxy resin system can be any liquid epoxy resin, that is, an epoxy resin having a viscosity of from about 600 cps. at 25° C. to about 90,000 cps. at 25° C. Thus, there may be employed the products obtained by reacting a polyhydric alcohol or polyhydric phenol with epichlorhydrin or dichlorhydrin in the presence of an alkali. These products may be derived from glycols, such as ethylene glycol, diethylene glycol, triethylene glycol, propylene glycol-(1:2)-, propylene glycol-(1:3), butylene glycol-(1:4), pentane-1:5-diol, hexane-1:6-diol and especially from diphenols, such as resorcinol, pyrocatechol, hydroquinone, 1:4-dioxynaphthalene, bis-(4-hydroxy phenyl)-methane, bis - (4-hydroxy phenyl)-methylphenyl-methane, bis-(4-hydroxy phenyl)-tolyl-methane, 4:4'-dihydroxy-diphenyl-methane, bis-(4-hydroxy phenyl)-sulfone and 2:2-bis-(4-hydroxy phenyl)-propane. Mixtures of the above liquid epoxy resins can also be employed.

The fluidized epoxy resin systems of the present invention can contain, in addition to the d-limonene employed as a diluent, any of the additives usually employed in compositions for the particular application intended in the proportions commonly employed. Thus, fillers of various types can be incorporated into the compositions for the achievement of particular structural or physical effects. Illustratively, such materials may comprise sand, asbestos, powdered glass, powdered aluminum, talc, or iron oxide. Dyes and pigments may likewise be employed to color the compositions. Resinous modifiers, such as phenolic resins, polyester resins, vinyl resins and polyamide resins can likewise be included. Plasticizers and flexibilizers, including epoxidized vegetable oils and polysulfide polymers, may also be employed. As previously stated the foregoing additives can be used in the amounts ordinarily employed in the particular area of use for which the composition is intended. Thus, amounts ranging from about 1 to about several hundred (i.e., 800) parts per hundred parts of resin can be employed.

In addition, the compositions can contain any of the hardening or curing agents employed in conjunction with epoxy resin systems. Thus, as curing agents there may be employed any of the well known amines or anhydrides for curing epoxy resins. As amines there may be mentioned, triethylamine, ethylene diamine, diethylamine, diethylene triamine, triethylene tetramine, pyridine, piperidine, N,N'-diethyl-1,3-propane diamine, tetraethylene pentamine, 1,4-diaminobutane, 1,3-diaminobutane, 3-(N-isopropylamino) - propylamine, 3,3'-imino-bispropylamine, monoethanolamine and N-aminoethyl piperazine, and the like. Suitable anhydrides are phthalic anhydride, tetrahydrophthalic anhydride, hexahydroxyphthalic anhydride, dodecenyl succinic anhydride and the like.

Any effective amount of curing agent may be employed. In general, the amount of curing agent will depend on the particular curing agent selected and will be based on the epoxy content of the compositions. Amine curing agents are generally employed in stoichiometric amounts, while anhydride curing agents are employed in 70–100 percent of stoichiometric amounts.

The compositions can be prepared by various methods. The epoxy resin and the d-limonene can be mixed together in the specified proportions to form a stable mixture which can be stored and transferred. This mixture can then be combined with the filler and curing agent at the time of application. It is, of course, also possible to combine the epoxy resin, the d-limonene, the curing agent and the filler at the same time. The various ingredients can be combined together in the absence of heat, but the use of heat will facilitate the mixing operation.

The following examples illustrate the invention, the parts being by weight:

EXAMPLE 1

In order to demonstrate the viscosity reducing effect of d-limonene on several representative epoxy resins d-limonene was combined with the resins listed in the accompanying table in the indicated proportions and the viscosities recorded. The results are set forth in Table I below.

Table I

| Component: D-Limonene | 0 | 5 | 10 | 15 |
|---|---|---|---|---|
| Resin A | 100 | 95 | 90 | 85 |
| Viscosity, cps. at 25° C | 1,800 | 330 | 146 | 80 |
| Resin B | 100 | 95 | 90 | 85 |
| Viscosity, cps. at 25° C | 12,000 | 6,050 | 1,660 | 540 |
| Resin C | 100 | 95 | 90 | 85 |
| Viscosity, cps. at 25° C | 4,500 | 2,020 | 730 | 325 |

Resin A is 3,4 epoxy-6-methylcyclohexylmethyl-3,4-epoxy-6-methylcyclohexanecarboxylate.

Resin B is an epoxy resin prepared by condensing epichlorhydrin with the product obtained by reacting 2 molecular proportions of o-cresol and 1 molecular proportion of formaldehyde in the presence of dilute hydrochloric acid, the condensation being effected in the presence of sodium hydroxide.

Resin C is an epoxy resin prepared by condensing epichlorhydrin with the product obtained by reacting 2 molecular proportions of phenol and 1 molecular proportion of formaldehyde in the presence of dilute hydrochloric acid, the condensation being effected in the presence of sodium hydroxide.

EXAMPLE 2

In order to demonstrate the effectiveness of d-limonene in effecting reduction in viscosity of epoxy resin systems, the amount of d-limonene required to reduce 100 parts of an unmodified liquid epoxy resin prepared by the reaction of bisphenol A and epichlorhydrin in the presence of alkali and having an epoxy content of 5.3–5.5 epoxide equivalents/kg. and a viscosity of about 12,000 cps. at 25° C. to a viscosity of 500 cps. at 25° C. was determined and compared with the amounts of several other diluents required to effect the same reduction. The results are recorded below in Table II.

Table II

| Diluent: | Amount, parts/100 parts resin |
|---|---|
| d-Limonene | 15.0 |
| 1,4-butanediol diglycidyl ether | 33.0 |
| Pine oil | 23.0 |
| Limonene dioxide | 37.5 |

EXAMPLE 3

A readily trowelable flooring composition was prepared by combining the listed ingredients in the indicated proportions:

| | Parts |
|---|---|
| Resin D | 95 |
| d-Limonene | 5 |
| Iron oxide | 3 |
| Graded sand | 500 |
| (50% 30–5 mesh) | |
| (50% 100–200 mesh) | |
| Triethylene tetramine | 10 |

The resulting flooring was cured for 7 days at 25° C., and exhibited the following properties:

| Compressive strength | 7600 p.s.i. |
|---|---|
| Flexural strength | 18,000 p.s.i. |
| Impact strength | 6.6 ft. lbs. |
| Barcol hardness | 90. |

The chemical resistance to dilute mineral acids, alkali, xylene and mineral spirits was excellent after 30 days' exposure to these substances.

The resin D employed in the composition of this example is a dibutyl phthalate modified epoxy resin prepared by reacting bisphenol A with epichlorhydrin in the usual manner in the presence of dibutyl phthalate, and having an epoxy content of 3.8–4.1 epoxide equivalents/kg. and a viscosity of about 1500 cps. at 25° C.

EXAMPLE 4

A readily trowelable flooring composition was prepared by combining the following ingredients in the listed proportions:

| | Parts |
|---|---|
| Resin E | 90 |
| d-Limonene | 50 |
| Iron oxide | 1.5 |
| Polyamide resin | 17 |
| Tri-(dimethylaminoethyl)-phenol | 4.5 |
| Graded sand | 540 |
| (50% 30–50 mesh) | |
| (50% 100–200 mesh) | |

The mixture troweled easily on a concrete surface and was cured for 7 days at 25° C. The cured flooring had the following properties:

| Compressive strength | 7,384 p.s.i. |
|---|---|
| Flexural strength | 15,300 p.s.i. |
| Impact strength | 5 ft. lbs. |
| Barcol hardness | 81. |

The flooring was exposed for 30 days to the following in order to determine its chemical resistance: 40% nitric acid, 30% hydrochloric acid, 50% acetic acid, 50% sodium hydroxide, xylene, mineral spirits, gasoline and hydraulic fluid. The resistance of the cured flooring to these materials was excellent.

The polyamide resin employed is a polyamide resin prepared by the condensation of dimerized unsaturated vegetable fatty acids and diethylene triamine.

The resin E employed in the composition of this example is an epoxy resin prepared by reacting bisphenol A with epichlorhydrin in the usual manner and having an epoxy content of 4.8–5.1 epoxide equivalents/kg. and a viscosity of about 18,000 cps. at 25° C.

What is claimed is:

1. A method for reducing the viscosity of a liquid 1,2-epoxy resin having a viscosity of from about 600 cps. at 25° C. to about 90,000 cps. at 25° C. which comprises incorporating therein d-limonene in an amount equal to from about 0.5% to about 15.0% by weight based on the epoxy resin content.

2. The process of claim 1 wherein the d-limonene is added in an amount equal to about 5.0% by weight based on the epoxy resin content.

3. A fluidized resinous composition comprising a liquid 1,2-epoxy resin having a viscosity of from about 600 cps. at 25° C. to about 90,000 cps. at 25° C. and from about 0.5% to about 15.0% by weight based on the epoxy resin content of d-limonene.

4. The composition of claim 3 wherein the composition further includes a filler.

5. The composition of claim 4 wherein the filler is present in a major proportion.

6. The composition of claim 5 wherein the filler is sand.

References Cited in the file of this patent

UNITED STATES PATENTS

| 2,556,488 | Wakeford et al. | June 12, 1951 |
| 2,665,266 | Wasserman | Jan. 5, 1954 |
| 2,786,794 | Gams et al. | Mar. 26, 1957 |
| 2,868,767 | Cyba et al. | Jan. 13, 1959 |

OTHER REFERENCES

Noller: Chemistry of Organic Compounds, 2nd edition, W. B. Saunders Company, Philadelphia, Pa. (1957), pages 853 and 855.

UNITED STATES PATENT OFFICE
CERTIFICATE OF CORRECTION

Patent No. 3,132,115 May 5, 1964

Frank Eric Pschorr et al.

It is hereby certified that error appears in the above numbered patent requiring correction and that the said Letters Patent should read as corrected below.

Column 4, line 11, for "50" read -- 10 --.

Signed and sealed this 8th day of September 1964.

(SEAL)
Attest:

ERNEST W. SWIDER
Attesting Officer

EDWARD J. BRENNER
Commissioner of Patents